United States Patent [19]
Echols et al.

[11] Patent Number: 5,934,207
[45] Date of Patent: Aug. 10, 1999

[54] METHOD AND APPARATUS FOR DISPOSING OF LEACHATE

[76] Inventors: Richard L. Echols, 5003 Westerdale, Fulshear, Tex. 77441; Bobby Ray Hawthorne, 5315 Nodaway La., Spring, Tex. 77379

[21] Appl. No.: 08/811,796

[22] Filed: Mar. 6, 1997

[51] Int. Cl.[6] .................................................. F23G 11/00
[52] U.S. Cl. ................................... 110/346; 110/345
[58] Field of Search ................................ 110/346, 238, 110/210, 211, 212; 588/228, 230, 205

[56] References Cited

U.S. PATENT DOCUMENTS

| | | | |
|---|---|---|---|
| 424,755 | 4/1890 | Blackman . | |
| 2,941,873 | 6/1960 | Brown et al. | 23/274 |
| 3,642,137 | 2/1972 | Furuta et al. | 210/152 |
| 3,881,430 | 5/1975 | Katz | 110/8 F |
| 3,918,374 | 11/1975 | Yamamoto et al. | 110/8 E |
| 3,941,065 | 3/1976 | Albrecht | 110/8 F |
| 3,972,811 | 8/1976 | Larkins, Jr. et al. | 210/71 |
| 4,078,503 | 3/1978 | von Dreusche, Jr. | 110/208 |
| 4,213,407 | 7/1980 | Headley | 110/346 |
| 4,230,536 | 10/1980 | Sech | 203/89 |
| 4,278,494 | 7/1981 | Lilja et al. | 159/16 A |
| 4,347,226 | 8/1982 | Audeh et al. | 423/207 |
| 4,475,065 | 10/1984 | Gravely | 110/238 |
| 4,534,828 | 8/1985 | Erickson et al. | 159/16.1 |
| 4,579,069 | 4/1986 | Gay et al. | 110/342 |
| 4,628,835 | 12/1986 | Wollner | 110/238 |
| 4,734,159 | 3/1988 | Korenowski | 159/16.1 |
| 4,765,257 | 8/1988 | Abrishamian et al. | 110/342 |
| 4,838,184 | 6/1989 | Young et al. | 110/346 |
| 5,032,230 | 7/1991 | Shepherd | 202/176 |
| 5,082,525 | 1/1992 | Travis | 159/16.1 |
| 5,156,098 | 10/1992 | Camp | 110/238 |
| 5,323,715 | 6/1994 | Fujiwara et al. | 110/238 |
| 5,342,482 | 8/1994 | Duesel, Jr. | 154/2 |
| 5,381,742 | 1/1995 | Linton et al. | 110/238 |
| 5,443,021 | 8/1995 | Trepaud | 110/219 |
| 5,484,279 | 1/1996 | Vonasek | 431/202 |

OTHER PUBLICATIONS

"Evap–O–Dry" Evaporator Manual by Fen–Tech Environmental, Inc.

*Primary Examiner*—Henry Bennett
*Assistant Examiner*—Malik N. Drake
*Attorney, Agent, or Firm*—Fulbright & Jaworski L.L.P.

[57] ABSTRACT

The present invention describes a method and apparatus for vaporizing and thermally incinerating leachate utilizing gas, including waste gas. The method of disposing of the leachate and waste gas comprises the steps of combusting waste gas in a fire tube heater submerged in leachate contained in a pressure-controlled tank, vaporizing the leachate with thermal energy absorbed from the fire tube heater, releasing the resulting leachate vapor through a pressure valve to a connecting enclosed thermal incinerator, and combusting the leachate vapor in the thermal incinerator thereby destroying volatile organics in the vapor.

18 Claims, 2 Drawing Sheets

METHOD AND APPARATUS FOR DISPOSING OF LEACHATE

BACKGROUND OF THE INVENTION

1. Field of the Invention

The present invention relates generally to an improved method and apparatus for disposing of leachate, including an improved method and apparatus for disposing of landfill produced leachate using landfill produced gases as fuel.

2. Brief Description of the Prior Art

Various gases are produced from the degradation of buried waste in landfills. These gases can be noxious, malodorous, flammable and/or potentially dangerous. Such gas can be withdrawn from the landfills and combusted in a flare whereby noxious components of the gases are oxidized into normal products of combustion before being released into the atmosphere.

Landfill leachates are produced from surface water and rainwater percolating through the buried waste or coming in contact with waste in landfills, thereby mixing noxious compounds into the liquid. This leachate can pollute other nearby water sources by seeping through the ground, therefore, it is generally desirable and necessary to remove the leachate before the water supplies are polluted. Extracted leachate can be safely disposed of by either storing the leachate in tanks (which does not eliminate the problem, but only contains it), transporting the leachate to a waste water treatment facility (which is costly), or treating the leachate on-site. A preferred method of treating leachate, and the focus of this invention, thermally changes the state of, then thermally incinerates the vaporized leachate using landfill gases as fuel.

Current methods of vaporizing leachate using landfill gas as fuel have several drawbacks. First, the evaporation chambers are not pressurized, therefore, leachate vapors leave the chamber at or near its condensation temperature and quickly return back to its liquid state. Also, open flues in the evaporation chamber allow burning gases and leachate vapor to mix which prevents separate downstream environmental control systems to deal with the two different toxic sources. In addition, open flues create the possibility of leachate backing up into and damaging the burner, especially if pressurized. The present invention overcomes these shortfalls.

SUMMARY OF THE INVENTION

The present invention describes a method and apparatus for the vaporizing and thermal incineration of leachate utilizing gas. Particularly, the present invention can be used for effectively disposing of landfill leachate using landfill gas. The method of disposing of the leachate and gas comprises the steps of combusting gas (including landfill gas or any other waste or fuel gas) in a fire tube heater submerged in leachate (including landfill leachate) contained in a pressure-controlled tank, vaporizing the leachate with thermal energy absorbed from the fire tube heater, releasing the resulting leachate vapor through a pressure valve to a connecting enclosed thermal incinerator, and combusting the noxious leachate vapor in the thermal incinerator to thermally destroy volatile organics in the vapor and render the vapor environmentally acceptable.

Another object of this invention is to thermally destroy volatile organics in the landfill gas by oxidizing the volatile organics in the gas through combustion of the gas in the fire tube heater.

Another object of the invention is to direct landfill gas exhaust from the fire tube heater to the flare as a method of achieving a single point source emission, which may be required by permitting authorities.

Another object of the invention includes conditioning the landfill gas in a gas conditioning system to improve the combustion efficiency of the gas.

Another object of the invention is to maintain an acceptable level of leachate in the pressure-controlled tank. This is accomplished by pumping more leachate into the tank from a leachate storage tank or other holding facilities as leachate in the tank is vaporized and released from the tank. Excess leachate may also escape through a leachate overflow outlet.

Another object of this invention is to release pressure from the tank through a relief valve when the pressure in the tank becomes too high. Escaping vapor may be directed to a flare or other thermal incinerator for combustion.

The present invention also discloses the physical elements needed to construct an apparatus to carry out the aforementioned objects. The basic apparatus comprises a tank, a flame tube positioned in the tank, a burner attached to the flame tube, and a pressure-controlled vapor outlet connected to the top of the tank. Other objects of the invention may be carried out using a thermal incinerator, a gas source, a gas conditioning system, a closeable leachate inlet, a leachate outlet, a leachate storage tank or other storage facilities, a leachate control system, a horizontal support plate, and a relief pressure valve.

Another object of this invention is to combust leachate vapors utilizing gas fuels (including waste gas like landfill gas) as a combustion fuel in a thermal incinerator.

Another object of the invention is to create a waste disposal system for leachate that is completely self-sufficient. This is accomplished by attaching an asynchronous power generator to the electrical distribution systems of the landfill. The generator is powered by an internal combustion engine utilizing conditioned landfill gas or other fuel sources as fuel and generates electrical power and combusted gas exhaust. The electric powered devices and its control systems can utilize the electric power, with any excess power being utilized for other applications, placed into the electric supply grid or sold back to the electric supply grid. The gas exhaust can be directed to the flare so that additional volatile organics may be further thermally destroyed at a single source point outlet.

Another object of this invention is to provide a leachate thermal incineration system where the combusting gas does not mix with the leachate or the leachate vapors. This allows further downstream cleaning of the two different waste streams which may contain different volatile organics. In addition, by separating the leachate from the burning gas in the flame tube, the tank can be pressurized without fear of backing the leachate into the burner system.

Another object of this invention is to provide a pressurized tank for vaporizing leachate. Leachate vapor under pressure reaches a higher temperature than non-pressurized vapor before it is released from the tank. The higher temperature allows the leachate vapor to travel a further distance to a thermal incinerator where the vapor is oxidized before the vapor can condense back into liquid leachate.

Another object of this invention is to provide a single source outlet for all emissions before being released into the atmosphere.

It is another object of this invention to provide a continuous process for disposing of leachate. By continuously pumping new leachate into the tank, the process never needs to be stopped except for normal maintenance.

Another object of this invention is to maximize heat transfer from the combusting gas to the liquid leachate by keeping the flame tube submerged in the middle of the leachate in the tank.

Another object of this invention is to efficiently utilize all available landfill or other on-site waste by-products in order to meet federal environmental regulations and incentives.

DETAILED DESCRIPTION OF THE INVENTION

Figure 1:
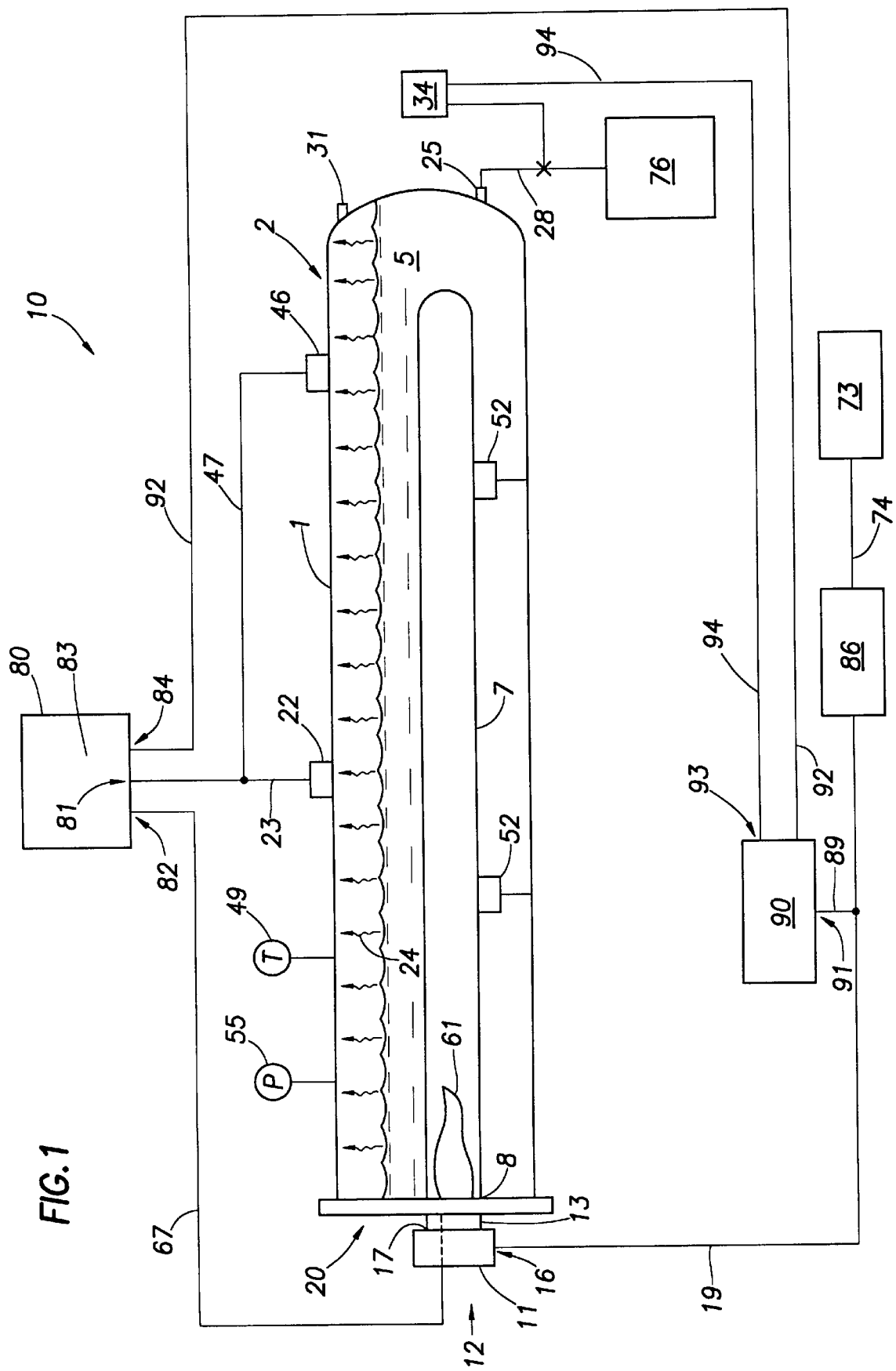
FIG. 1 is a schematic view of the apparatus used for disposing of landfill produced leachate in accordance with the preferred embodiment of this invention, and includes a side view of the vaporizing tank.
Figure 2:
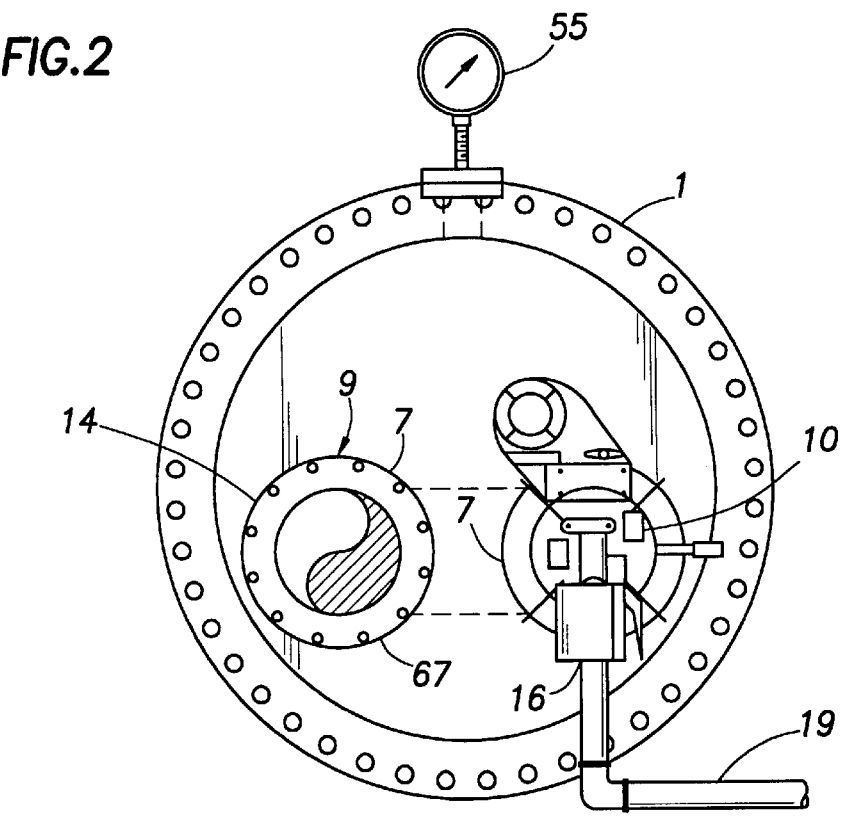
FIG. 2 is a front view of the vaporizing tank utilized in the preferred embodiment of this invention.
Figure 3:
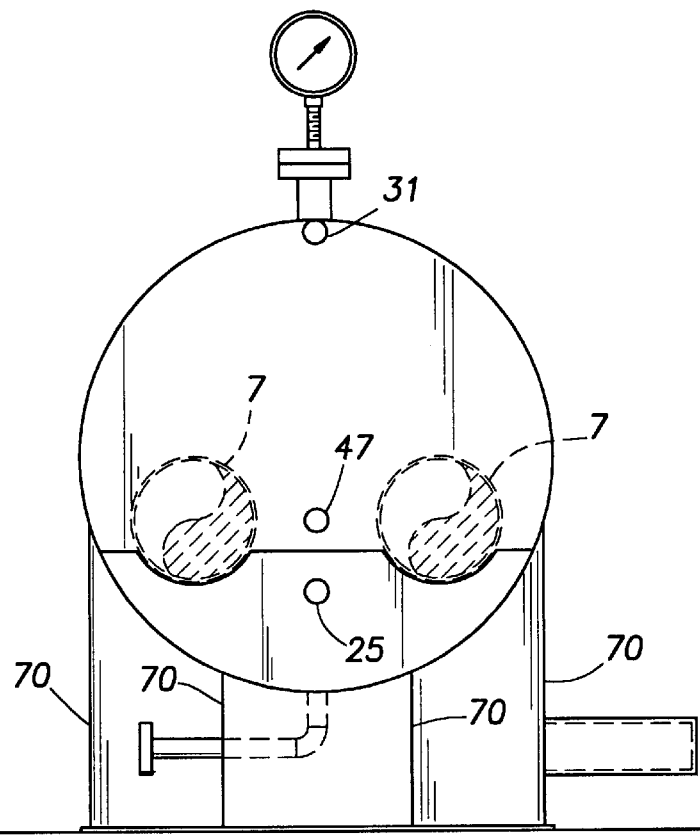
FIG. 3 is a top view of the vaporizing tank utilized in the preferred embodiment of this invention.

Referring now to the drawings, the apparatus of the present invention is illustrated and generally designated by the numeral 10. The apparatus 10 is shown with a leak-free holding tank 1 for water based liquid or fluid such as the water based leachate 5. For the purposes of this invention, leachate includes all contaminated, or by-product, or waste liquids. The preferred embodiment discusses disposing of landfill leachate. Tank 1 may be constructed from various materials such as carbon steel and preferably has support legs 70 of various designs. Tank 1 may be insulated for both safety and efficiency with various materials such as fiberglass. If desired, tank 1 can be of any appropriate geometrical configuration, including the cylindrical shape shown in the drawings.

Fire tube burner 12 is attached to and positioned within tank 1. Fire tube burner 12 comprises flame tube 7 attached to burner 11. Flame tube 7 extends approximately along the longitudinal axis of tank 1 so that it is submerged in and completely surrounded by leachate 5. The submerged flame tube 7 allows for better heat transfer into leachate 5 than many prior art systems which direct the heat onto the surface of the leachate. Flame tube 7 is solid and hermetically sealed from the leachate 5 so that gas combusting within the flame tube does not come in contact with the surrounding leachate 5. Flame tube 7 has a flaming gas inlet port 8 and a gas exhaust port 9 at either end of flame tube 7. Flaming gas inlet port 8 connects to burner inlet opening 13 on the front portion 20 of tank 1. Likewise, gas exhaust port 9 is connected to burner exhaust opening 14 on the front portion 20 of tank 1. Flame tube 7 should be positioned in and connected to tank 1 in a fashion to prevent leakage of leachate out of tank 1 or into fire tube burner 12. As one skilled in the art will appreciate, this can be accomplished in any number of ways including through welding the flame tube 7 to tank 1 or through a flange connection system. As desired, any suitable shape of flame tube 7 can be utilized, including straight, winding, or U-shaped as disclosed in the drawings.

Burner 11 contains gas inlet 16 and flaming gas outlet 17. Burner 11 may be connected to flaming gas inlet port 8 of flame tube 7 at burner inlet opening 13. As can be appreciated, this connection may be done in any number of ways, including welding or a flange connection system. In addition, positioning burner 11 at burner inlet opening 8 refers to positioning the burner at a location proximate enough to flame tube 7 so that substantially all of the gas ignited by burner 11 is combusted in flame tube 7. Gas conduit 19 connects to the burner 11 at its gas inlet 16 so as to connect the burner 11 to gas source 73.

Pressure-controlled vapor release 22 is attached to upper portion 2 of tank 1 and allows leachate vapor 24 to escape tank 1. Pressure builds within tank 1 as the leachate 5 heats up from the combustion of gas in flame tube 7 and evaporates within the closed environment of tank 1. When the pressure in tank 1 reaches a predetermined level, pressure-controlled vapor release 22 allows leachate vapor 24 to escape from tank 1 into vapor conduit 23. The temperature of leachate vapor 24 is higher than it would be if tank 1 was not pressurized. Because leachate vapor 24 is released at a higher temperature, it can travel for a longer period of time and over longer distances through vapor conduit 23 before the leachate vapor 24 begins to condense. In addition, the pressure in tank 1 forces leachate vapor 24 through vapor conduit 23. Leachate vapor 24 travels through vapor conduit 23 to vapor inlet 81 of flare 80. Leachate vapor 24 is then burned in combustion zone 83 of flare 80 where volatile organics in the leachate vapor 24 are thermally destroyed through combustion and oxidization. The pressure at which leachate vapor 24 is released from tank 1 through pressure-controlled vapor release 22 can be varied. One reason to adjust the pressure is dependent upon how far leachate vapor 24 must travel to reach combustion zone 83. For example, size conditions may require tank 1 to be placed further from flare 80, bringing the need for higher pressure and temperature release to send leachate vapor 24 to flare 80 for combustion.

As can be appreciated by one skilled in the art, flare 80 can be any thermal incinerator that thermally destroys volatile organics. The thermal incinerator in the preferred embodiment uses waste gas (including landfill gas) as a combustion fuel to thermally destroy the volatile organics in the leachate vapor 24 or gas exhausts in the thermal incinerator. In this preferred embodiment, more waste gas such as landfill gas can be productively utilized. One skilled in the art will appreciate that any gas or combustion fuel can be used to thermally incinerate the organics in the leachate vapor 24 or gas exhaust.

Instead of a thermal incinerator, apparatus 10 can be connected to a thermally driven prime mover which converts the energy in the leachate vapor 24 into mechanical or electrical energy. Instead of destroying the organics in the leachate vapor, the vapor is being used in a constructive manner to create more energy. The thermally driven prime mover includes steam turbines/engines/movers, generators, or any system which converts thermal or steam energy into mechanical or electrical energy.

Leachate 5 is supplied into tank 1 through leachate inlet 25. Leachate conduit 28 is attached to tank 1 at leachate inlet 25 and connects tank 1 to leachate storage tank 76. A leachate control system 34 can be attached at leachate inlet 25 and inlet 31. As can be appreciated in the art, a leachate level control system can be attached in any number of suitable fashions. Leachate control system 34 monitors the level of leachate 5 in tank 1. When the level of leachate 5 is too low, leachate control system 34 will allow leachate to enter tank 1 through leachate inlet 25. Outlet 95 provides a connection for removing leachate from the tank.

A relief valve 46 is attached to the upper portion 2 of tank 1 as an emergency escape valve should pressure-controlled vapor release 22 become clogged or non-functional. Should leachate vapor 24 escape through relief valve 46, it may travel through relief vapor conduit 47 and reconnect with vapor conduit 23 where the leachate vapor will continue on to flare 80. As can be appreciated, relief upper conduit 47 can also release the leachate vapor 24 directly into flare 80, into another cleaning or disposal system, or into the atmosphere. Apparatus 10 may also be equipped with pressure gauge 55 or temperature gauge 49 to monitor the internal conditions of tank 1.

Flame tube 7 may be supported by one or more support plates 52 which are attached to the bottom and/or sides of tank 1 in a rigidly stable position so that flame tube 7 may rest upon or be attached to the support plates 52. As can be appreciated in the art, any number of support systems can be utilized to maintain flame tube 7 in the approximate center of tank 1. Thermal heat transfer from flame tube 7 to leachate 5 is maximized when flame tube 7 is positioned, for example, in the center of the tank, so that it is submerged in leachate 5. However, flame tube 7 can be positioned anywhere within tank 1 or even along the exterior of tank 1.

Gas exhaust from gas exhaust port 9 of flame tube 7 may be released into the atmosphere or carried to flare 80 via gas exhaust conduit 67. Gas exhaust conduit 64 is connected to flare 80 at exhaust gas inlet 82. Gas exhaust traveling through gas exhaust conduit into combustion zone 83 of flare 80 will further oxidize the exhaust gas and thermally destroy more volatile organics. Releasing gas exhaust through flare 80 also allows all emissions to exit through a single point source outlet. Instead of a flare, gas exhaust from gas exhaust port 9 may be injected into any type of thermal incinerator or any type of air cleansing or purifying system.

As utilized in the preferred embodiment, gas source 73 will typically consist of landfill gas. Landfill gas must typically be conditioned in a gas conditioning skid 86 before it can be efficiently utilized in an engine or efficiently burned. Therefore, the preferred embodiment of apparatus 10 runs landfill gas from gas source 73 to gas conditioning skid 86 where the gas is conditioned for practical applications. As one in the art will appreciate, apparatus 10 can utilize any other type of fossil fuel, including various on-site waste gases or other natural gases brought in from outside sources. The type of fuel used will determine if it needs conditioning.

Apparatus 10 also requires a source of electrical energy to run leachate control system 34 along with other electrical control systems such as a burner control system or a motor control system (not shown). This electrical power can be supplied by an asynchronous power generator 90 and supply any required power using the landfill gas as fuel. Conditioned landfill gas from gas conditioning skid 86 travels to the asynchronous power generator 90 through fuel conduit 89 and enter through fuel inlet 91. An asynchronous power generator 90 can be utilized to supply electric power from noxious landfill gas. Asynchronous power generator 90 produces electric energy through power outlet 93 which is carried through power conduit 94 to leachate control system 34, any other control system of apparatus 10 that may have electrical needs, or the electrical supply grid for the landfill. Asynchronous power generator 90 also produces a gas exhaust which may be directed into exhaust gas inlet 84 of flare 80 through gas exhaust conduit 92 where the exhaust gas may be further oxidized in combustion zone 83. This process not only further reduces pollutants in the gas, but it also allows for a single point source outlet for apparatus 10. Apparatus 10, when including asynchronous power generator 90, not only produces enough energy to run apparatus 10, but produces excess energy which can be directed to other applications or the electric supply grid.

The preferred embodiment as described in apparatus 10 is primarily used to efficiently dispose of noxious landfill leachate using landfill gas. The disposal method comprises of combusting landfill gas from a gas source 73 (after possibly being conditioned in gas conditioning skid 86) in fire tube burner 12. The gas is ignited in burner 11 of fire tube burner 12, thereby creating a flame 61 that extends into flame tube 7 through flaming gas inlet port 8. The flaming gas results in thermal energy being transferred through the walls of flame tube 7 into the liquid leachate 5 which surrounds flame tube 7. The thermal energy boils leachate 5 and causes it to vaporize. The resulting leachate vapor 24 contains volatile organics which should be oxidized or combusted before they are released into the atmosphere. The leachate vapor 24 leaves tank 1 through pressure-controlled vapor release 22 when the pressure in enclosed tank 1 reaches a predetermined level. Leachate vapor 24 released from tank 1 travels through vapor conduit 23 into flare 80 where the volatile organics are oxidized and thermally destroyed in combustion zone 83. The oxidized vapor is then released from flare 80 into the atmosphere.

The gas exhaust from the combustion of gas in fire tube heater 12 may be directed from flame tube 7 through gas exhaust conduit 67 to flare 80 where any remaining volatile organics will undergo a second attempted oxidization. As explained before, this would create a single point source outlet.

As described above, waste gas such as landfill gas can be used to thermally incinerate leachate vapors. In this manner, an otherwise unwanted landfill by product can be put to productive use. The use of waste gas to thermally incinerate leachate vapors can be utilized with any leachate vaporizing system, including the apparatus and method disclosed in this patent. Any waste gas can be utilized including flare gas from an oil and gas field, landfill gas, or any other by-product gas.

The preferred application for the present invention is for the on-site destruction of leachate and gases produced in a landfill. As one skilled in the art can appreciate, this invention may have other applications. Leachate is not confined to landfill waste water, but includes any polluted or noxious waste water. The gas used for heating the leachate does not have to be landfill gas, but can be any combustible gas from any source. Naturally, the invention provides the added advantage of cleaning gas emissions if the gas used is a noxious or toxic gas.

As previously discussed, the present invention can be used to dispose of various different kinds of leachate as defined herein. As a result, the present invention can be used in a number of other applications besides landfills, including concentrating salt water pools using flare gas in an oil and gas field, eliminating or reducing hazardous waste produced in a manufacturing facility, and reducing washing waste fluids used to clean a freighter, railroad car, or any other storage tank or process vessel. As can be seen by the foregoing examples, the present invention can be used in almost any application that requires an environmental cleanup on a cost effective method of solving a liquid waste or hazard problem.

It can be seen from the foregoing that a new and novel way of disposing of leachate and gas, including landfill produced leachate and gas, is demonstrated by the present invention.

While the preferred embodiment of the invention has been described, modifications thereof can be made by one skilled in the art without departing from the spirit of the invention.

We claim:

1. A method of disposing of leachate, comprising the steps of:
- combusting gas in a fire tube heater submerged in said leachate being contained in a pressure controlled tank, said combusting step injecting thermal energy into said leachate;
- vaporizing said leachate with said thermal energy, thereby creating leachate vapor containing volatile organics;
- releasing said leachate vapor through a pressure-controlled exhaust valve to a thermal incinerator; and
- combusting said leachate vapor in said thermal incinerator so that at least a portion of said volatile organics are thermally destroyed.

2. The method of claim 1 wherein said leachate is landfill leachate, said gas is landfill gas containing volatile organics and said combusting step of said landfill gas thermally destroys at least a portion of said volatile organics in said landfill gas and creates a gas exhaust.

3. The method of claim 2 further comprising the steps of exhausting said gas exhaust from said fire tube heater to said thermal incinerator and combusting said gas exhaust in said thermal incinerator.

4. The method of claim 2 further comprising the step of conditioning said landfill gas in a gas conditioning skid so that the gas is prepared for combustion.

5. The method of claim 1 wherein said gas is waste gas.

6. The method of claim 1 wherein said combustion of said leachate vapor step uses landfill gas as fuel to combust said leachate vapor.

7. The method of claim 1 wherein said tank has a burner inlet opening and a burner exhaust opening, and wherein said fire tube burner has a flaming gas inlet port coupled to said burner inlet opening and a gas exhaust port coupled to said burner exhaust opening.

8. The method of claim 1 further comprising the step of maintaining the fire tube burner submerged in said leachate by pumping more of said leachate from a leachate storage tank into said tank as said leachate in said tank is vaporized and released from said tank.

9. The method of claim 1 further comprising the step of maintaining a predetermined range of said leachate in said tank with a leachate level control system.

10. The method of claim 1 further comprising the step of releasing pressure from said tank through a pressure relief valve when said pressure in said tank reaches a predetermined level.

11. The method of claim 1, wherein said combusting said leachate vapor step thermally destroys the majority of said volatile organics.

12. The method of claim 1, wherein said thermal incinerator is a flare.

13. A method of disposing of leachate and waste gas, comprising the steps of:
- vaporizing said leachate with thermal energy in a tank, thereby creating leachate vapor containing volatile organics;
- combusting said leachate vapor in a thermal incinerator so at least a portion of said volatile organics are thermally destroyed using said waste gas as a fuel for combustion.

14. The method of claim 13, wherein said leachate is landfill leachate and said waste gas is landfill gas.

15. The method of claim 13, wherein said thermal incinerator is a flare.

16. The method of claim 13, wherein said vaporizing said leachate step comprises of combusting said waste gas in said tank, thereby creating said thermal energy for vaporizing said leachate.

17. The method of claim 16, wherein said combusting said waste gas step creates gas exhaust containing volatile organics, further comprising the step of combusting said gas exhaust in said thermal incinerator.

18. A method of disposing of leachate, comprising the steps of:
- combusting gas in a fire tube heater submerged in said leachate being contained in a pressure controlled tank, said combusting step injecting thermal energy into said leachate;
- vaporizing said leachate with said thermal energy, thereby creating leachate vapor containing volatile organics;
- releasing said leachate vapor through a pressure-controlled exhaust valve to a thermally powered prime mover; and
- converting the energy from said leachate vapor into mechanical or electrical energy in said thermally powered prime mover.

* * * * *